UNITED STATES PATENT OFFICE.

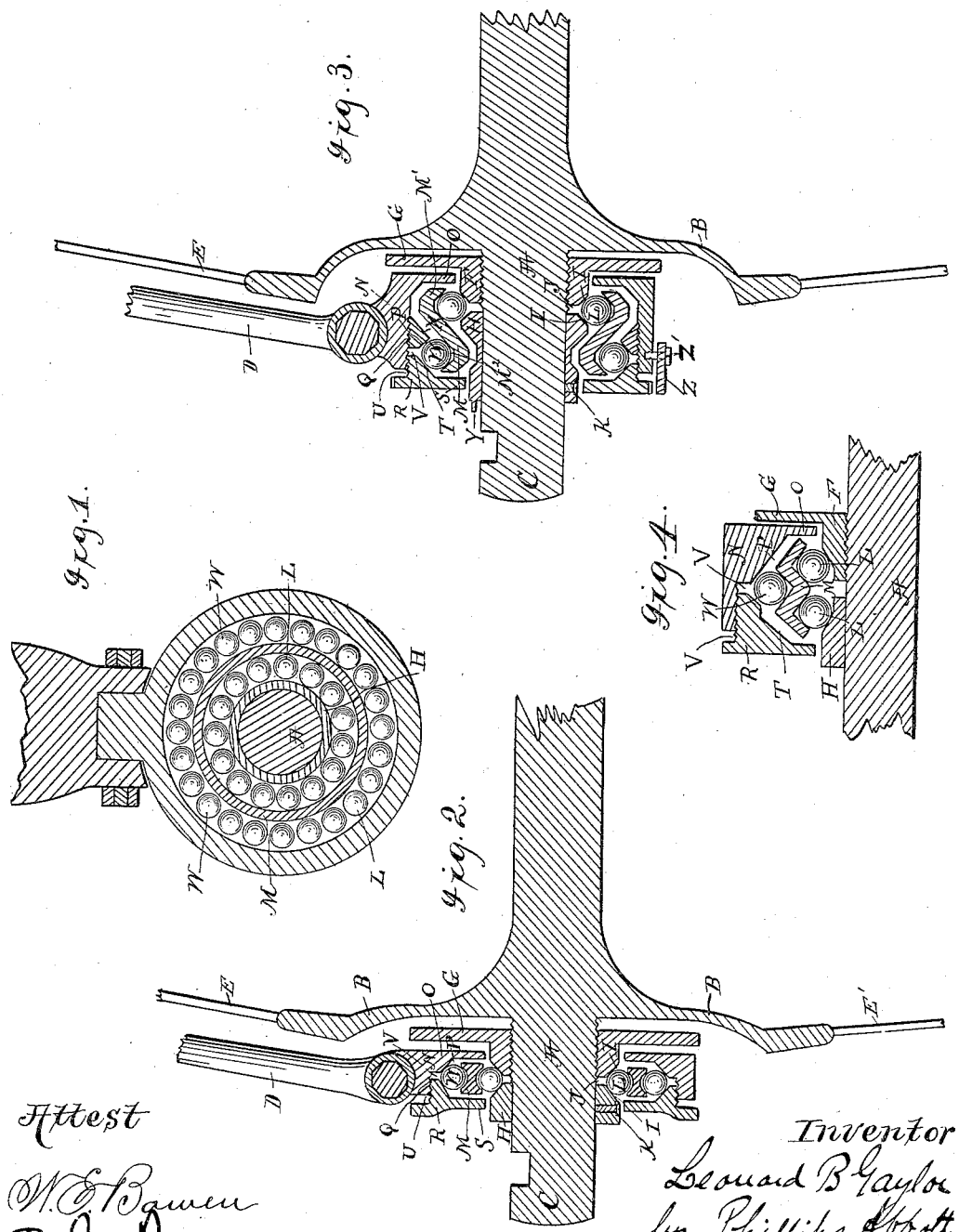

LEONARD B. GAYLOR, OF STAMFORD, CONNECTICUT.

ANTI-FRICTION BEARING.

SPECIFICATION forming part of Letters Patent No. 409,782, dated August 27, 1889.

Application filed February 4, 1888. Serial No. 263,050. (No model.)

*To all whom it may concern:*

Be it known that I, LEONARD B. GAYLOR, a citizen of the United States, and a resident of Stamford, in the county of Fairfield and State of Connecticut, have invented certain new and useful Improvements in Anti-Friction Devices, of which the following is a specification.

My invention relates to improvements in "ball-bearings," so called, for velocipedes, bicycles, and like structures, applicable also to vehicles of other classes and to anti-friction journals generally.

In the drawings like letters indicate like parts in all the figures.

Figure 1 illustrates a sectional view of one form of my invention. Fig. 2 illustrates a cross-sectional view of the invention shown in Fig. 1. Fig. 3 illustrates a modified construction of my invention. Fig. 4 illustrates still another form of my invention.

In Figs. 2 and 3 I show only one half of the axle and coacting parts, the other half being exactly the same in construction and operation.

Ball-bearings have heretofore been made with one or more circles of balls interposed between the shaft or axle and the inner periphery of a casing or shell forming the hub or journal-box proper. As thus constructed, the grinding of the balls against each other, because of their meeting surfaces moving in different directions, and also any jamming or crowding of the balls in the grooves in which they run, has a tendency to carry the external shell, journal-box, or hub around with them in the same manner that the friction of an axle or shaft in an ordinary hub or journal-box has the tendency to carry it around in the same direction, and the friction which has to be overcome by lubricants, ball-bearings, and other anti-friction devices arises from the fact that the hub or journal-box is fixed and does not turn with the axle or shaft.

By my invention I interpose a freely-rotatable annulus between double rows or circles of anti-friction balls or rollers, one circle of balls bearing on the axle or shaft and the inner periphery of the annulus, and the other circles of balls bearing against the outer periphery of the annulus and the inner surface of the hub or journal-box. Thus the annulus is practically the hub or journal-box for the axle or shaft; but instead of being fixed it is capable of rotation in the same direction as that in which the axle or shaft moves should the friction or jamming of the balls exert such a tendency upon it, and because of this construction involving the freely-rotatable annulus and the dual circle of balls any friction in one part is nullified by the anti-friction devices in another, and the rotation of the wheel or shaft greatly facilitated. Moreover, as these bearings have been heretofore constructed, if one of the balls or rollers should break or split, the two parts thereof grind around in with the other balls and greatly injure, if not destroy, them, as well as the grooves or surfaces in which they move. By my invention, if such occurrence should take place, the annulus would continually revolve, and all damage to the machine would be avoided.

In the drawings I have illustrated my invention as embodied in the main wheel of a bicycle, and shall hereinafter speak of the axle of such wheel and its coacting parts without reference to shafting or journals; but I wish it to be understood, as already stated, that my invention extends to such apparatus, and that I include the same herein.

A is the axle of the wheel. B is the spoke-receiving flange attached to the axle.

C is the extending end of the axle to which the treadle-crank is attached.

D is one of the frame-rods of the bicycle.

E E' are spokes.

F is a ring that is threaded to the axle and provided with a radially-extending flange G, which excludes dirt, &c., and by means of which the ring F may be turned, if desired, to adjust the bearings. The ring F is fastened when in position by any suitable well-known means. H is another ring snugly fitted on the axle. The meeting edges of the rings F and H are beveled off at I, thus forming an annular V-shaped groove in which the balls turn. These rings are separated by a slight space J, which affords a "take-up," so called, to compensate for wear. The ring H is held in place on the axle by set-screws K.

L L are the inner circle of balls.

M is the annulus, the inner and outer surfaces of which are grooved either with a rounded or V-shaped groove, as preferred. All the ball-receiving grooves may be V-shaped or rounded, or of such other construction in cross-section as preferred. The annulus is supported entirely by the balls L L, and has no contact with any other part of the apparatus, excepting the outer circle of balls hereinafter described.

N is the main bearing ring or hub of the wheel. To it the frame-rods D are bolted, as shown. It is provided with an inwardly-extending flange O and an inclined surface P and an inner flat threaded surface Q.

R is a ring which constitutes the other half or portion of the hub. It is provided with an inwardly-extending flange S, an inclined surface T, and an outer threaded surface U, which correspond, respectively, with the parts O, P, and Q of the ring N. A "take-up" space V is also provided between the rings N and R.

W W are the external circle of balls.

The method of putting the parts together and their operation are as follows: The ring F is first screwed to the desired position on the axle. The ring N is then slipped over the end of the axle and allowed to rest against the flange G. The balls L and annulus M are then placed in position, and the ring H is then pressed onto the axle until it takes a bearing against the balls L and fastened by the set-screws K. The balls W are then properly adjusted to the ring N, resting in the groove of the annulus M, the ring N being held up adjacent to the annulus for this purpose. The ring R is then screwed to the ring N until the surfaces P and T take a bearing on the balls W. The rods D may then be bolted to the ring N and the assembling of the other parts of the machine proceeded with as usual. It will be seen from the foregoing that ordinarily the rotation will be confined to the inner circle of balls, because they are nearer the center of the axle than the outer circle; but the moment any excess of friction arises from any cause then the annulus M will itself turn by the rotation of the outer circle of balls until the excess of friction has been avoided.

The above-described construction is perhaps the best adapted for carriage-axles, shafting, and the like moving surfaces, where heavy weights or great pressures are present, because the two circles of balls are in the same or practically the same radial plane; but for velocipedes, bicycles, tricycles, and the like structures, where the weights are light and the enlargement of the hubs and added weight in the machine would be objectionable, I prefer the construction shown in Figs. 3 and 4, which I herein illustrate specifically, that their construction may be fully understood.

Referring to Fig. 3, all the parts are of the same general construction as those above described, and shown in Figs. 1 and 2, excepting that instead of the annulus M being a narrow ring with grooves on its opposite sides in the same plane and with the inner and outer circle of balls in the same radial plane the annulus M is made in the general form of the letter S placed horizontally, and having one groove or ball-containing recess M' presented inwardly and the other M² presented outwardly, the balls L, which bear against the axle, resting in the groove M', and the balls W, which engage with the hub-rings, resting in the groove M². This construction necessitates or can best be carried out by the employment of a supplemental ring X, which supplies the inclined or rounded surface P for the support of the balls W. I prefer to construct this ring X as shown, having threads on its outer surface, which engage with corresponding threads on the inner surface of the ring N.

It is obvious that the annulus M may be made in such manner that the outer circle of balls W will be either to the right or left of the balls L; also, that the curvature of the annulus and the shape of the rings N R and their adjacent parts may be such that the circle of balls which engages with the said rings will be of less diameter than that of the circle of balls which engages with the axle. In this Fig. 3 I illustrate also at Y another method of securing the ring H, Y being a pin or dowel which enters a hole in the side of the hub of the treadle-crank and is held firmly by it. I also show a means of preventing the ring R from unturning, consisting in a clamp Z, which is provided with recesses on its under surface, which engage with corresponding teeth on the edge of the ring R, whereby, when the clamp is screwed rigidly to the ring N by the screw Z', unturning of the ring will be prevented. The method of assembling the parts when constructed as shown in Fig. 3 may be readily understood from the former description of the method of assembling when the parts are constructed as shown in Figs. 1 and 2.

In Fig. 4 I illustrate still another form of my invention. In it all the parts are lettered the same as in the other figures, and they are constructed in substantially the same manner, excepting that the annulus M is made with two inwardly-presented ball-holding grooves and one intermediate outwardly-presented ball-holding groove. Of course this construction could be directly reversed, having two grooves presented outwardly and one inwardly.

It is obvious that rollers may be used instead of balls in connection with my improved devices, and also that the outer surface of the annulus may engage with a smooth surface on the inside of the hub or journal-box, which, being suitably lubricated, will allow the annulus to slip around should the excess of friction above referred to occur, tending to prevent the proper action of the inner circle of balls.

I do not limit myself to the details of construction described and shown, since alterations may be made therein and still my invention be employed.

Having described my invention, I claim—

1. The combination, in an anti-friction device, of a plurality of rows of balls or rollers, an annulus placed between them in contact only with the balls themselves arranged to revolve independently with either row of balls or rollers, and adjustable bearings attached to the shaft or axle, substantially as set forth.

2. The combination, in an anti-friction device, of a plurality of rows of balls or rollers, an annulus placed between them in contact only with the balls themselves arranged to revolve independently with either row of balls or rollers, and adjustable bearings attached to the hub or journal box, substantially as set forth.

3. The combination, in an anti-friction device, of a plurality of rows of balls or rollers, an annulus placed between them in contact only with the balls themselves arranged to revolve independently with either row of balls or rollers, and adjustable bearings for the balls upon the shaft or axle and upon the hub or journal box.

4. The combination, in an anti-friction bearing, of one or more circles of balls interposed between the axle and an annulus or bearing, said annulus being free to revolve inside of other circles of balls, and adjustable bearings on the outer side of the outer circles of balls and on the inner side of the inner circle of balls to compress them toward the annulus as a means of taking up wear or adjusting the bearing, substantially as set forth.

5. The combination, in an anti-friction device, of a plurality of rows of balls or rollers and an annulus placed between them, the ball-receiving groove in the annulus being in different radial planes and in substantially the same horizontal plane, whereby the diameter of the hub or journal is reduced, substantially as set forth.

6. The combination, in an anti-friction device, of a plurality of rows of balls or rollers, an annulus placed between them in contact only with the balls or rollers themselves, the ball-receiving grooves in the annulus being in different radial planes, and adjustable bearings for the balls, whereby the wear thereof may be compensated or "taken up," substantially as set forth.

7. The combination, in an anti-friction bearing, of lateral adjustments both upon the shaft or axle and upon the journal-box or bearing as a means of adjusting or taking up wear either toward or from the axle, or in both directions at once, as the condition of the bearing may require.

8. The combination, in an anti-friction bearing, of a clamp Z in the under side of the bearing-case, for the purpose set forth.

Signed at New York, in the county of New York and State of New York, this 1st day of February, A. D. 1888.

LEONARD B. GAYLOR.

Witnesses:
PHILLIPS ABBOTT,
F. G. HERTER.